G. WALTHER.
WHEEL.
APPLICATION FILED MAY 19, 1919.
1,346,863.
Patented July 20, 1920.
2 SHEETS—SHEET 1.
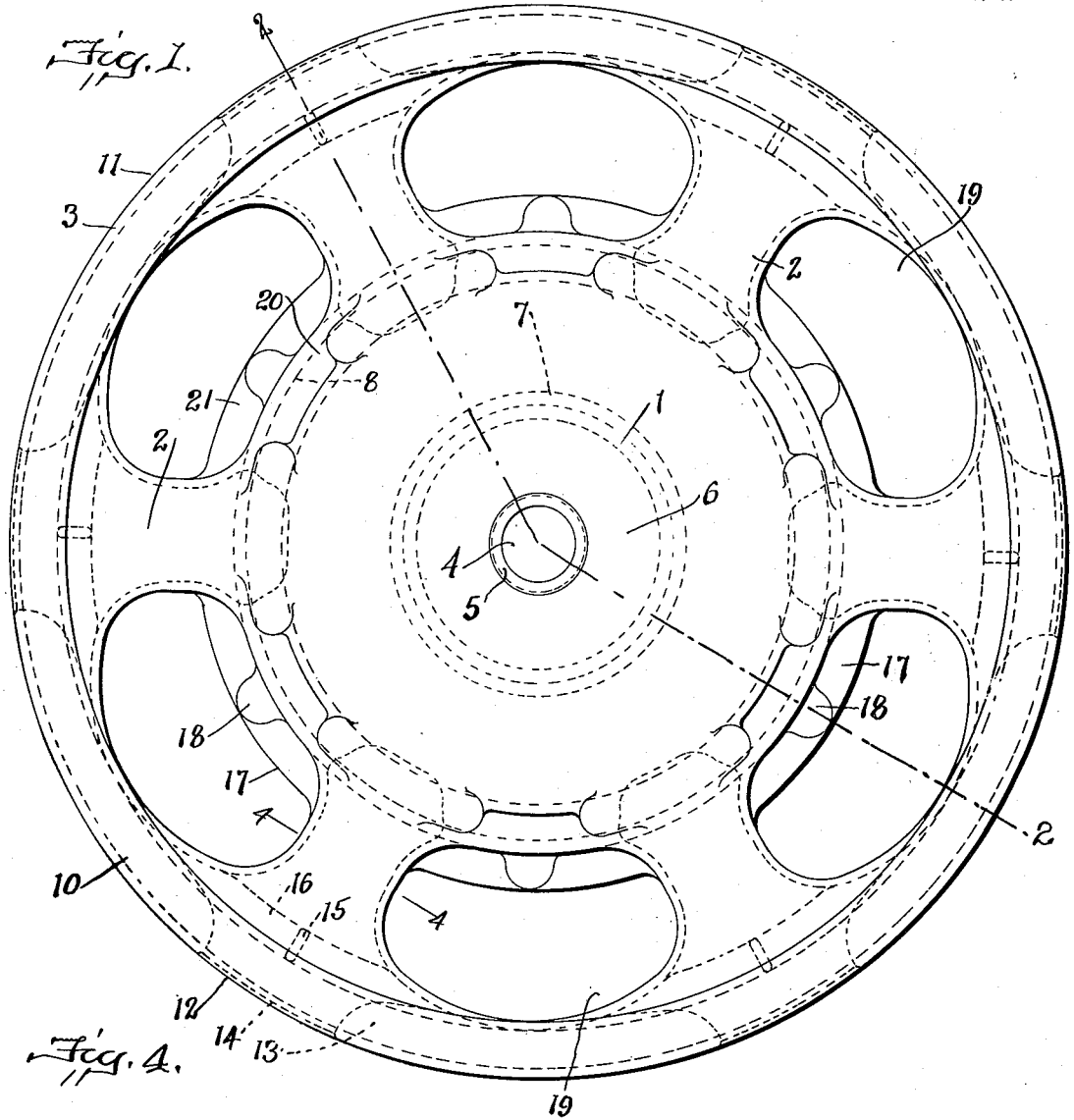
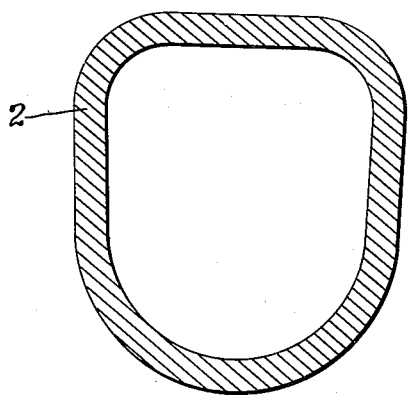
George Walther, Inventor
Toulmin & Toulmin,
Attorneys

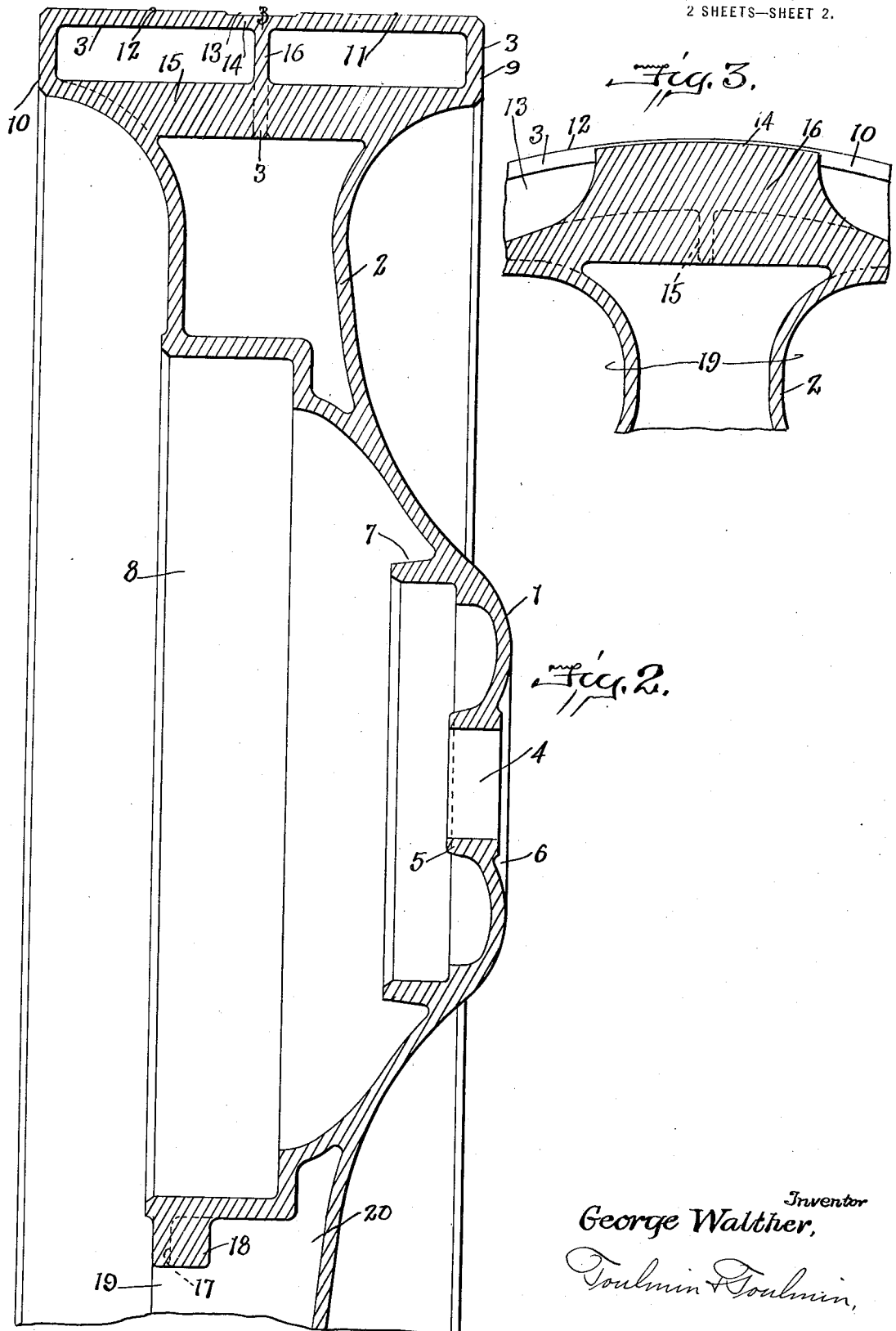

UNITED STATES PATENT OFFICE.

GEORGE WALTHER, OF DAYTON, OHIO, ASSIGNOR TO THE DAYTON STEEL FOUNDRY COMPANY, OF DAYTON, OHIO, A CORPORATION OF OHIO.

WHEEL.

1,346,863.  Specification of Letters Patent.  Patented July 20, 1920.

Application filed May 19, 1919. Serial No. 297,994.

*To all whom it may concern:*

Be it known that I, GEORGE WALTHER, a citizen of the United States, residing at Dayton, in the county of Montgomery and State of Ohio, have invented certain new and useful Improvements in Wheels, of which the following is a specification, reference being had therein to the accompanying drawing.

This invention relates to steel wheels of the general type shown in Patent #1,304,130 issued to me May 20th, 1919, and has for its particular object to provide a wheel of this character having special provision made therein for lightness of construction and resiliency with relatively great strength and durability.

It is an object of the present invention to provide a wheel designed symmetrically wherein the stresses or wheel shocks will be equally distributed and absorbed in a large measure, and having special provision to prevent loose soil being engaged and carried with the wheel in the operation thereof.

My improved wheel, as in my earlier invention, is preferably formed integrally, special attention having been given in the design thereof to provide a construction that will permit of the molding operations being performed with facility and with the minimum loss in defective castings.

In the accompanying drawings:—

Figure 1 is a side elevation of the wheel;

Fig. 2 is a detailed cross sectional view taken on the line 2—2 of Fig. 1;

Fig. 3 is a detailed cross sectional view taken on the line 3—3 of Fig. 2; and

Fig. 4 is a cross sectional view of one of the wheel spokes taken on the line 4—4 of Fig. 1.

As here shown the wheel consists of integral hub 1, spokes 2 and rim or felly sections 3, the hub consisting of an enlarged central body portion of the wheel convex toward the inner side of the wheel and concave toward the outer side thereof, as shown in Fig. 2 of the drawings.

The hub has the usual aperture 4 adapted to receive the spindle of an axle upon which the wheel may be mounted. It will be understood that the integral wheel here shown is supplemented by an oppositely disposed hub portion which is attached to the wheel to form the outer hub thereof, but which forms no part of the present invention and is therefore not shown in the drawings.

Surrounding the aperture 4 and extending inward of the concave portion of the hub is an annular flange 5 which serves, together with the wall of the hub, as the journal bearing of the wheel, and outwardly of the aperture 4 is an annular depression 6 which acts as a self-cleaning bearing entrance.

A second annular flange 7, concentric with the aperture 4, is formed within the concavity of the hub and serves as a support or retainer for ball or roller bearings which are used in the preferred construction of the complete wheel.

A third annular flange 8, concentric with the aperture 4 and constituting the outer member of the wheel brake mechanism, is formed in an extension of the enlarged hub wall, and acts further to close the inner end of the spoke cavity, thus protecting the bearings of the wheel from ingress of grit through the hollow spokes.

The spokes 2 are arch-shaped in cross section substantially as shown in Fig. 4 of the drawings, extending outwardly from the hub wall and the outer edge of the brake flange 8, and spreading laterally at their outer ends in sharp curves to substantially the width of the felly and to a juncture of the curves between opposite spokes.

A series of radially extending flanges 17 are interposed between the spokes substantially in the vertical plane of the outer walls thereof, bosses or lugs 18 being provided in the flanges for bolting the detachable parts of the wheel thereto. Oblong, oval-shaped open spaces 19 are formed between the spokes, and depressions 20 and 21 are formed between the spoke bases on the inner face of the wheel, thus adding attractiveness of design and further lightening the construction.

The felly consists of oppositely disposed annular box flanges 9 and 10 and the tread rims 11 and 12 spaced apart by longitudinal apertures 13. Longitudinally adjacent the spokes are tie plates 14 which serve to join the rims 11 and 12 together. These plates are secured to the inner walls of the rims 11 and 12 to avoid finishing thereof, and are braced or supported by a truss frame within the spreading end of the spokes and consist of the transverse cross frame 15 extending transversely between the spreading spoke walls and a radial web portion 16. This arrangement adds very materially to the strength of the felly construction without materially increasing the weight of the wheel.

From the foregoing detailed description, the construction of my improved wheel and the objects realized through the novel features thereof will be readily understood. While the preferred form of the wheel is substantially as here shown, material variations in the details of construction and arrangement may be made without departing from the principles of the invention. Such departures from the exact construction shown are contemplated and comprehended in the appended claims.

Having thus fully described my invention, what I claim as new and desire to secure by Letters Patent, is:—

1. A metal wheel consisting of a felly, spokes and a concave-convex hub having an inwardly projecting flange forming an axle bearing, a self-cleaning bearing entrance outwardly adjacent said bearing, an annular flange within the concavity of the hub forming a bearing support, and an annular flange concentric with the axle bearing extending inwardly adjacent the concavity of said hub and forming one element of the brake mechanism of said wheel.

2. A metal wheel consisting of a felly, spokes and a concave-convex hub having an inwardly projecting flange forming an axle bearing, an annular flange within the concavity of the hub forming a bearing support, and an annular flange concentric with the axle bearing extending inwardly adjacent the concavity of said hub and forming one element of the brake mechanism of said wheel.

3. A metal wheel consisting of a felly, spokes and a concave-convex hub having an inwardly projecting flange forming an axle bearing, and an annular flange concentric with the axle bearing extending inwardly adjacent the concavity of said hub and forming one element of the brake mechanism of said wheel.

4. A metal wheel consisting of a felly, spokes and a concave-convex hub having an inwardly projecting flange forming an axle bearing, an annular flange concentric with the axle bearing extending inwardly adjacent the concavity of said hub and forming one element of the brake mechanism of said wheel, and a series of flanges extending outwardly of the brake flange and forming junctures at their opposite ends with said spokes.

5. A metal wheel consisting of a felly, spokes and a concave-convex hub having an inwardly projecting flange forming an axle bearing, and an annular flange within the concavity of the hub forming a bearing support.

6. A metal wheel consisting of a concave-convex hub, hollow spokes formed integrally therewith and supporting a felly consisting of oppositely disposed rims, and a truss plate secured to the inner walls of said spokes and supporting said rims.

7. A metal wheel consisting of a concave-convex hub having a brake flange, hollow spokes formed integrally with said hub and flange and supporting a felly consisting of oppositely disposed rims, and a truss plate secured to the inner walls of said spokes and supporting said rims.

8. A metal wheel consisting of a concave-convex hub having a brake flange, a series of peripherally extending flanges on the brake flange, hollow spokes formed integrally with the hub and said flanges and supporting a felly consisting of oppositely disposed rims.

9. A metal wheel consisting of a concave-convex hub, hollow spokes formed integrally therewith and supporting a felly consisting of oppositely disposed rims, and a truss plate interposed between each spoke and the inner walls of said rims.

10. A metal wheel consisting of a concave-convex hub, hollow spokes formed integrally therewith and supporting a felly consisting of annular side flanges supporting the outer edges of a plurality of oppositely disposed rims, and a truss plate seated in each of said spokes and extending outwardly to support the inner edges of said rims.

11. A metal wheel consisting of a concave-convex hub, hollow spokes formed integrally therewith and supporting a felly consisting of annular side flanges supporting the outer edges of a plurality of oppositely disposed rims, and a truss plate having a transverse portion secured in each of said spokes and a longitudinally extending portion secured to the inner edges of said rims and having its outer surface substantially within the tread surface of the rims.

12. A metal wheel consisting of a concave-convex hub, hollow spokes formed integrally therewith and supporting a felly consisting of annular side flanges and oppositely disposed rims spaced apart and having longitudinally extending open spaces and depressions therein.

13. A metal wheel consisting of a felly, spokes and a concave-convex hub having an inwardly projecting flange forming an axle bearing, hollow spokes formed integrally therewith and spreading outwardly at their inner and outer bases to form a series of symmetrical, oval-shaped open spaces therebetween, and depressions formed in the convex surface of said hub inwardly adjacent said open spaces.

14. A metal wheel consisting of a felly, spokes and a concave-convex hub having an inwardly projecting flange forming an axle bearing, hollow spokes formed integrally therewith and spreading outwardly at their inner and outer bases to form a series of symmetrical, oval-shaped open spaces therebetween, and a series of radially disposed hub flanges interposed between the spokes in said open spaces.

In testimony whereof, I affix my signature.

GEORGE WALTHER.